(12) United States Patent
Yajima et al.

(10) Patent No.: US 7,194,153 B1
(45) Date of Patent: Mar. 20, 2007

(54) OPTICAL SWITCH DEVICE

(75) Inventors: Masao Yajima, Nagano (JP); Hidekazu Yoneyama, Nagano (JP); Sadayoshi Yasuda, Nagano (JP); Yuji Fujita, Nagano (JP); Ryuji Kawamoto, Kyoto (JP); Yoichi Nakanishi, Kyoto (JP); Yuichi Suzuki, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/558,334

(22) PCT Filed: May 26, 2004

(86) PCT No.: PCT/JP2004/007167

§ 371 (c)(1),
(2), (4) Date: Nov. 23, 2005

(87) PCT Pub. No.: WO2004/104673

PCT Pub. Date: Dec. 2, 2004

(30) Foreign Application Priority Data

May 26, 2003 (JP) .............................. 2003-148257
May 26, 2003 (JP) .............................. 2003-148258

(51) Int. Cl.
*G02B 26/08* (2006.01)
(52) U.S. Cl. ............................. 385/18; 385/52; 385/24; 385/15; 385/16; 385/17
(58) Field of Classification Search .................. 385/15, 385/16, 17, 18, 24, 52, 19
See application file for complete search history.

(56) References Cited

U.S. PATENT DOCUMENTS 5,915,063 A * 6/1999 Colbourne et al. .......... 385/140
5,926,588 A * 7/1999 Murakami et al. ............ 385/16
6,016,292 A 1/2000 Lee (Continued)

FOREIGN PATENT DOCUMENTS

JP 57-139704 8/1982

(Continued)

OTHER PUBLICATIONS

International Search Report dated Jun. 23, 2004 (2 pages).

*Primary Examiner*—Frank G. Font
*Assistant Examiner*—Guy G. Anderson
(74) *Attorney, Agent, or Firm*—Flynn, Thiel, Boutell & Tanis, P.C.

(57) ABSTRACT

An optical switch device for driving a movable member mounting a light reflection member thereon by a magnetic drive circuit, wherein, in an optical waveguide switching device (1) as an optical switch device, a movable member (2) mounting thereon an optical waveguide switching prism mirror (2) is driven in an X direction by a magnetic drive circuit while being floated from a fixing-side member (13) in order to improve stability of a light outputting position. When the movable member (2) is moved to a desired position in the X direction, power supply to solenoids (45, 46) is stopped in a clamp mechanism (40), and a clamp plate (41) presses the movable member (2) against the fixing-side member (13) to fix it. A V-groove (30) formed in the movable member (2) and a V-groove (31) formed in the fixing-side member (13) mesh each other to position the movable member (2) in the X direction.

16 Claims, 7 Drawing Sheets

U.S. PATENT DOCUMENTS

| | | |
|---|---|---|
| 6,625,344 B2 * | 9/2003 | Liao et al. .................... 385/18 |
| 6,711,321 B2 * | 3/2004 | Helin et al. ................... 385/19 |
| 6,721,112 B2 * | 4/2004 | Ikegame .................... 359/824 |
| 2002/0001429 A1 * | 1/2002 | Milanese et al. ............. 385/18 |
| 2003/0049879 A1 * | 3/2003 | Lin ............................. 438/52 |
| 2003/0076574 A1 | 4/2003 | Chen et al. |

FOREIGN PATENT DOCUMENTS

| | | |
|---|---|---|
| JP | 01-101507 | 4/1989 |
| JP | 06-095015 | 4/1994 |
| JP | 06-160738 | 6/1994 |
| JP | 10-283649 | 10/1998 |
| JP | 11-326795 | 11/1999 |
| JP | 2002-250874 | 9/2002 |
| WO | WO 95/17697 | 6/1995 |

* cited by examiner

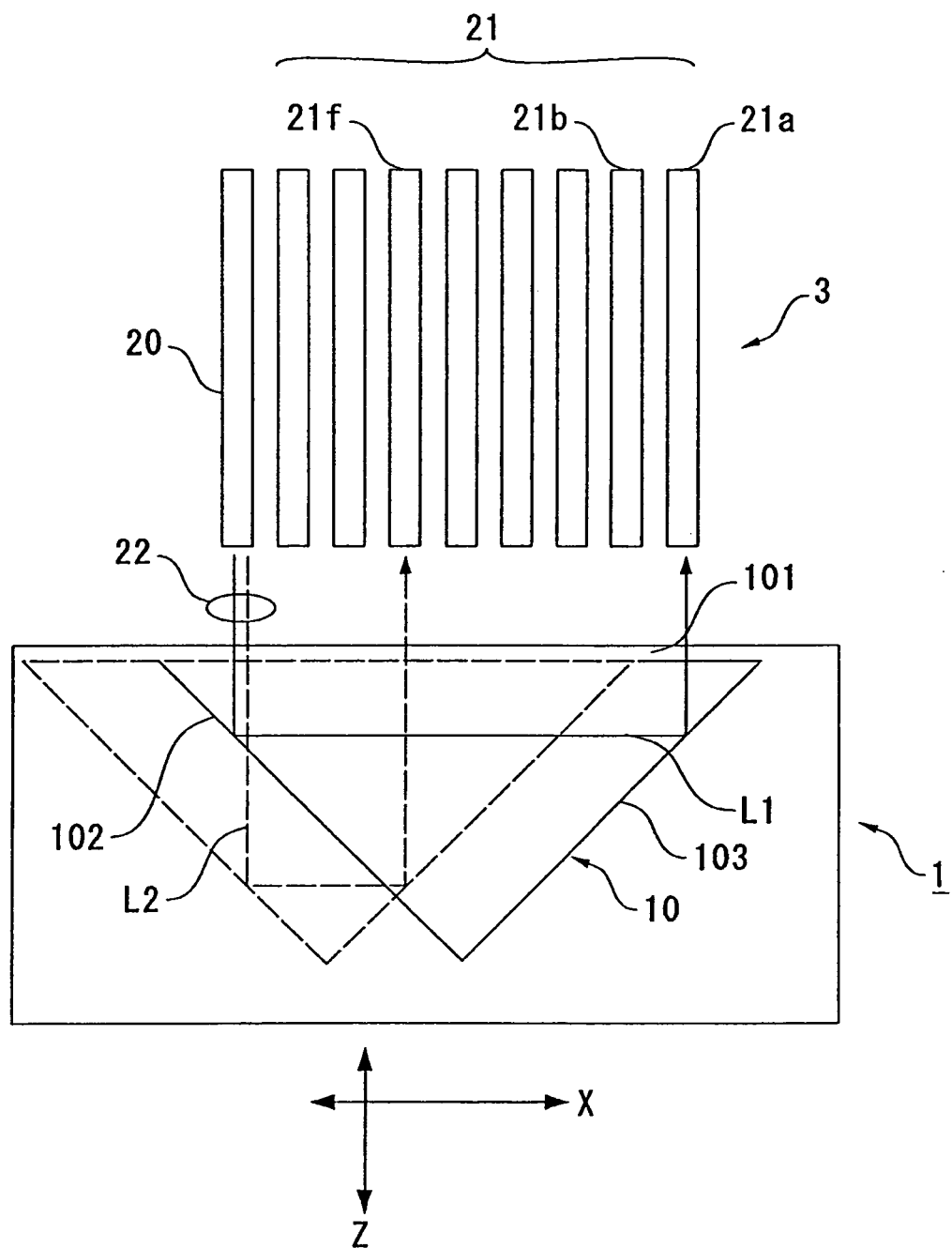
[FIG. 1]

[FIG. 2]
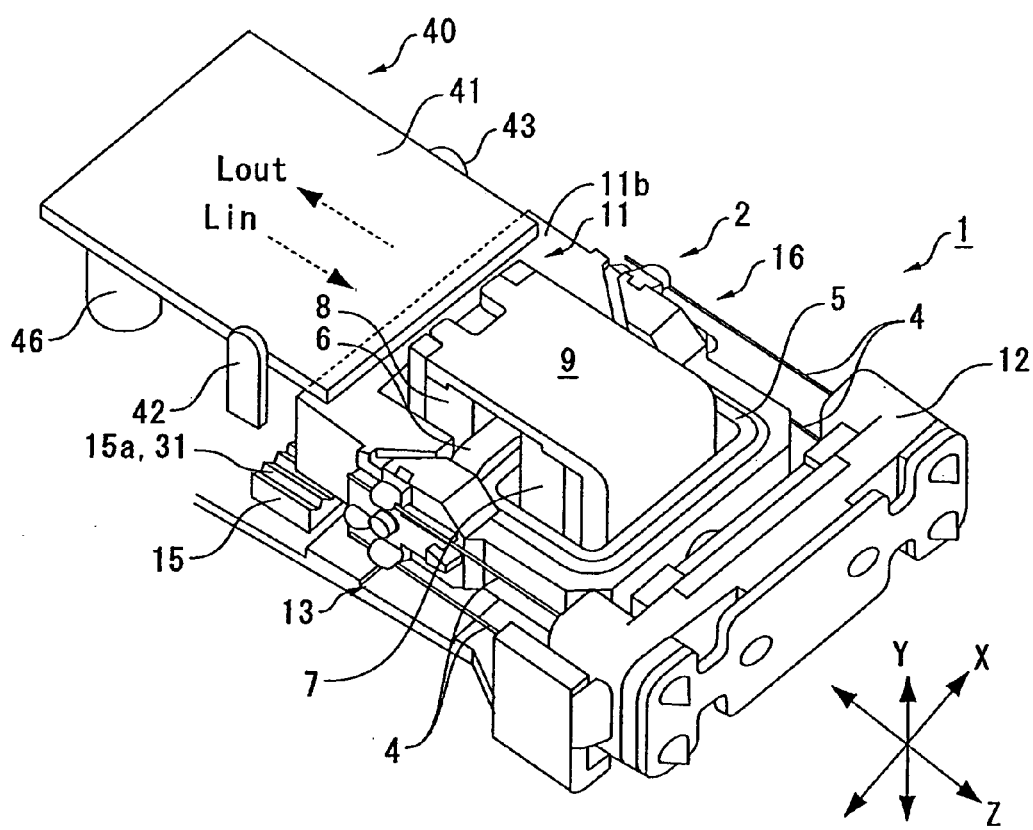

[FIG. 3]
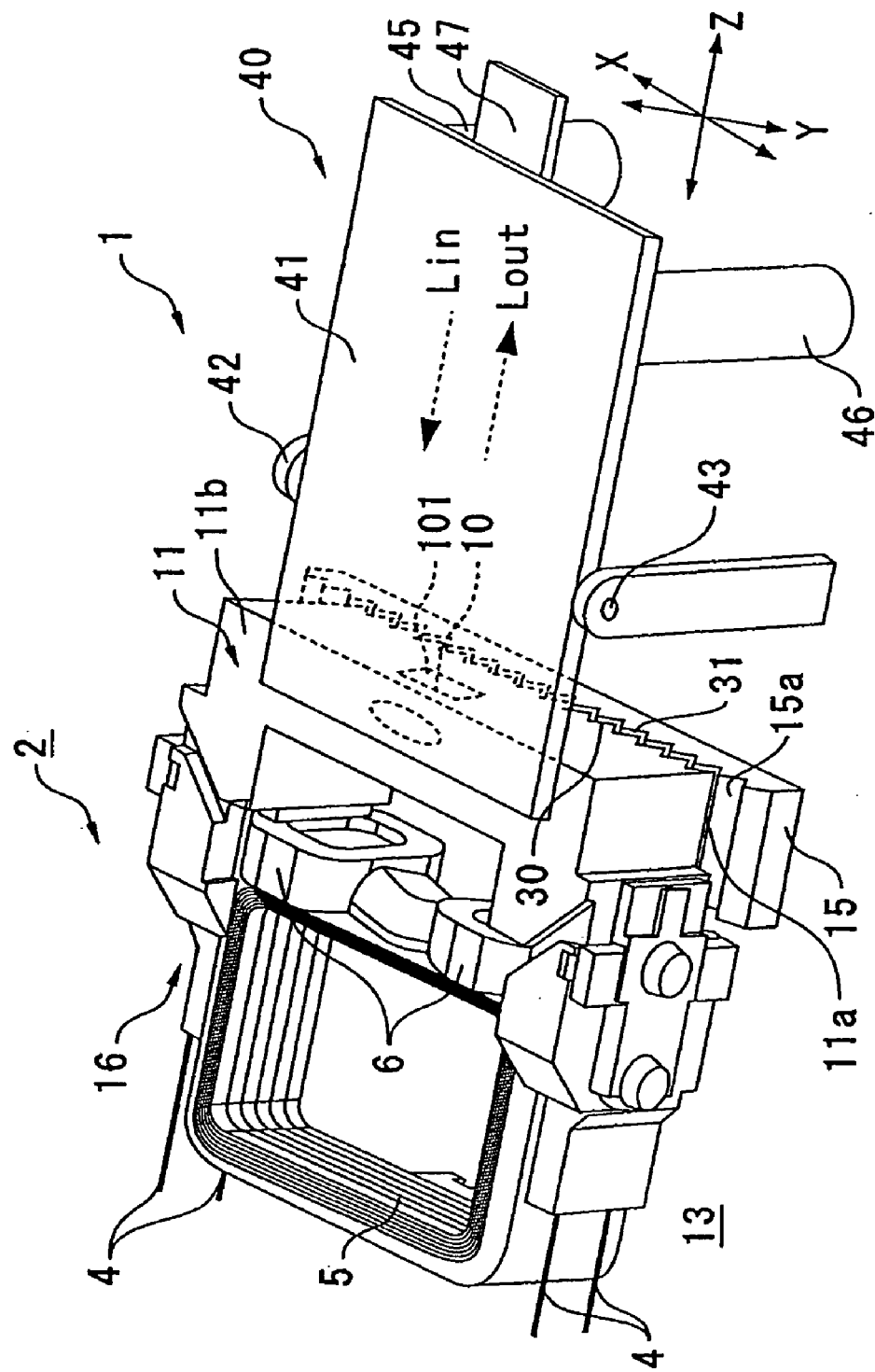

[FIG. 4]
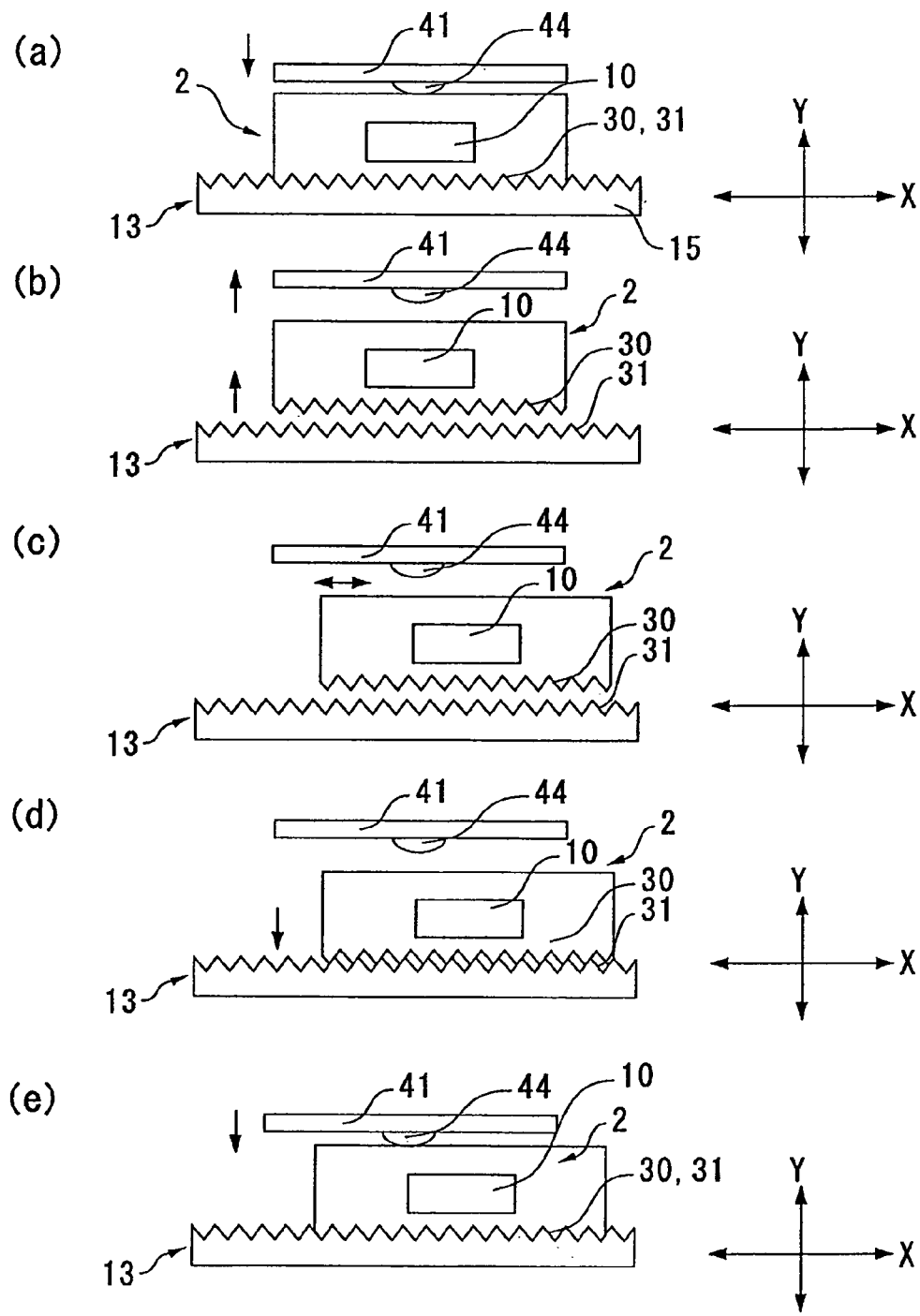

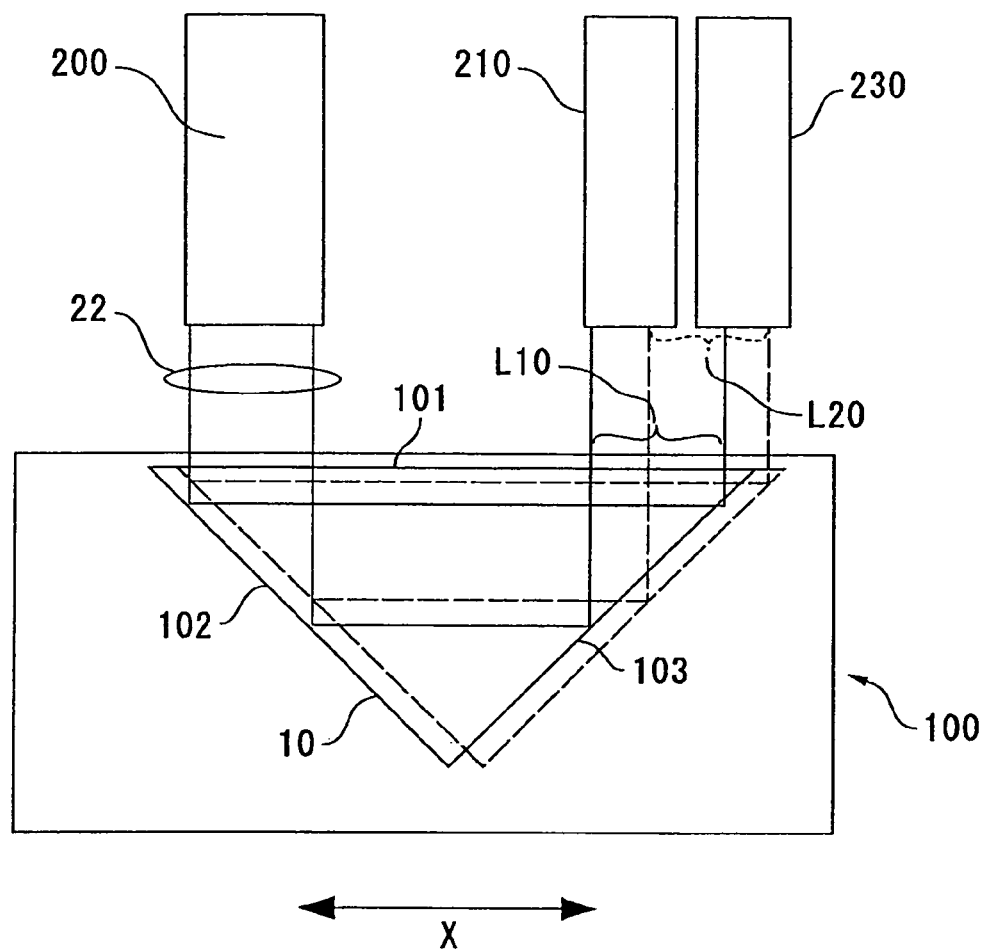
[FIG. 5]

[FIG. 6]
(a)
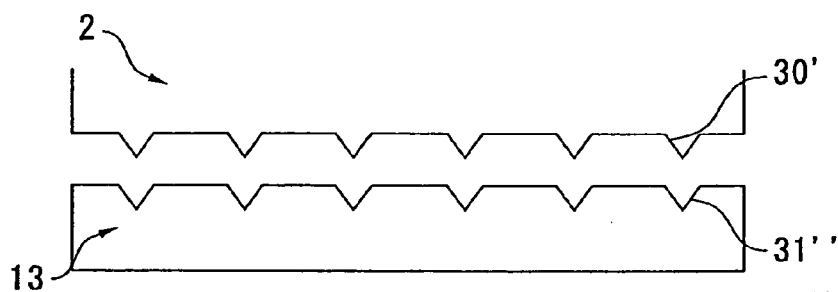
(b)
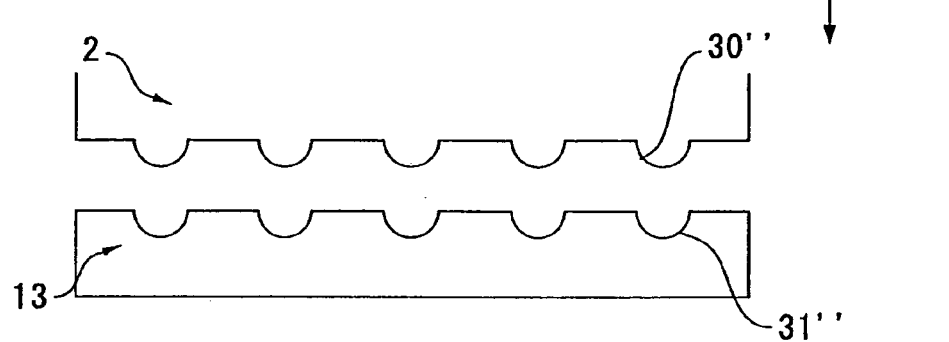

[FIG. 7]
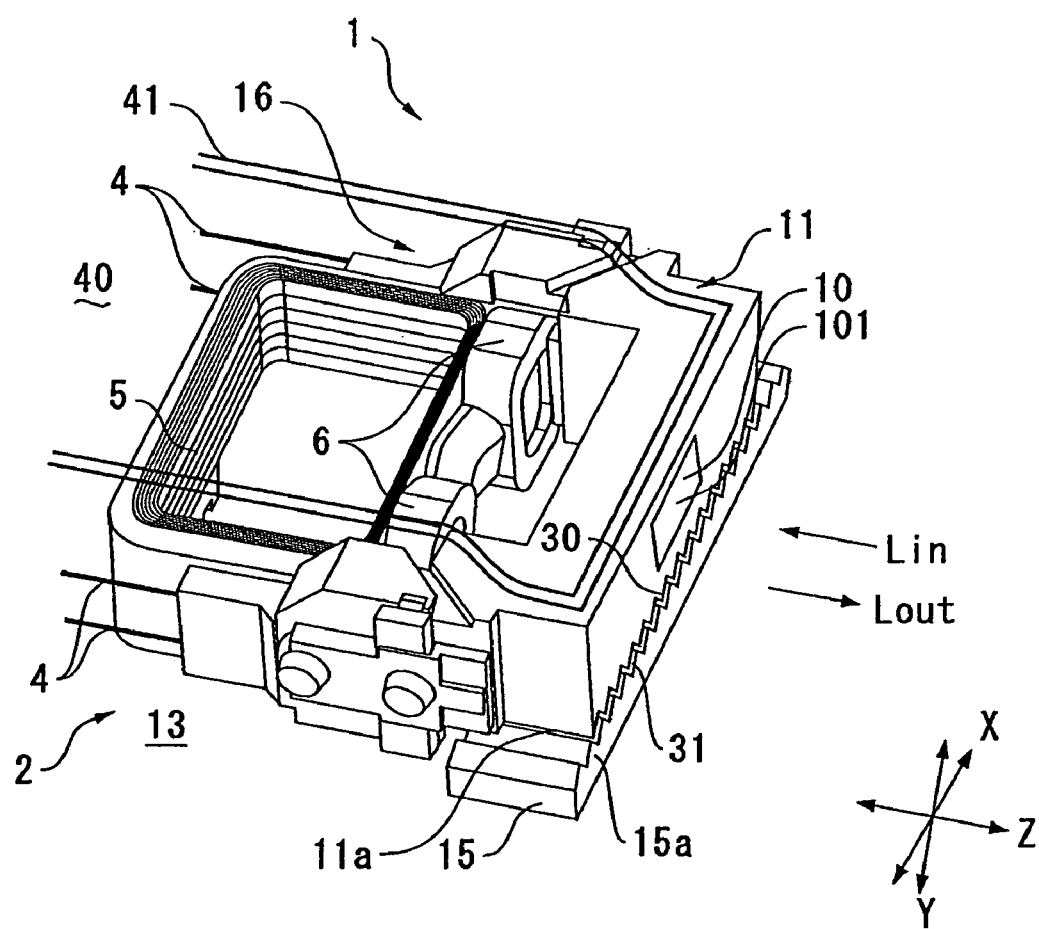

OPTICAL SWITCH DEVICE

TECHNICAL FIELD

The present invention relates to an optical switch device that is used as an optical waveguide switching device for fiber-optic exchangers, or as a variable optical attenuator for suitably attenuating optical input, and more specifically relates to a driving technique for a light-reflecting member that switches the light-emitting position.

BACKGROUND ART

Known as optical switch devices that are used as optical waveguide switching devices for fiber-optic exchangers, or as variable optical attenuators for suitably attenuating optical input, are optical waveguides which use refractive index fluctuation caused by the heat of optical fiber, and MEMS (Micro Electro Mechanical System) that use a micro actuator and a micro optical element produced by a semiconductor process, as disclosed in JP-A 2002-250874.

DISCLOSURE OF THE INVENTION

Problems to be Solved by the Invention

However, optical waveguide switching devices of the optical waveguide type have a considerable optical loss due to coupling and branching of the optical waveguide fiber. The lifespan of the device is relatively short since power must be constantly fed to the heater in order to maintain the switched condition the optical waveguide. MEMS-type optical switches, on the other hand, suffer from high manufacturing costs because semiconductor processes are used.

The present applicants have also considered optical switches in which a movable member mounted with a light-reflecting member is driven by using a magnetic drive circuit. However, this type of optical switch device has a drawback in that the stability of the light-emitting position is poor because the movable member is easily positionally offset due to external vibrations and other effects.

In view of such problems, an object of the present invention is to provide a configuration that allows the stability of the light-emitting position to be improved in an optical switch device in which a movable member mounted with a light-reflecting member is driven by using a magnetic drive circuit.

Means to Solve the Problems

In order solve the above-described problems, the present invention provides an optical switch device which has a movable member mounted with a light-reflecting member for reflecting light that is incident from the Z-direction and emitting the light from a prescribed position offset in the X-direction, a fixed-side member for movably supporting the movable member in the X- and Y-directions, and a magnetic drive circuit for driving the movable member in the X- and Y-directions, the X-, Y-, and Z-directions being perpendicular to each other, wherein the device has a clamp mechanism for releasing the movable member when the movable member is to be driven, and for pushing the movable member in the Y-direction when the movable member has been driven to a prescribed position in the X-direction so as to press and fix the movable member to the fixed-side member.

In the present invention, a movable member is pressed and fixed to a fixed-side member by a clamp mechanism in the initial state. From this state, the clamp mechanism first releases the clamp on the movable member when the light-emitting position is switched, and the magnetic drive circuit then drives the movable member in the Y-direction and lifts the movable member from the fixed-side member. The magnetic drive circuit subsequently drives the movable member to a prescribed position in the X-direction. When the movable member then arrives at the prescribed position in the X-direction and stops thereat, the movable member is thereafter pressed and fixed by the clamp mechanism to the fixed-side member. Therefore, the movable member is not offset in the X-direction and the stability of the light-emitting position is high, even if vibrations or other effects are transmitted from the outside.

In the present invention, the clamp mechanism preferably has a pushing portion for pushing the movable member toward the fixed-side member, a spring member for generating urging force whereby the pushing portion presses and fixes the movable member to the fixed-side member, and a solenoid for resisting the urging force of the spring member and separating the pushing portion from the movable member. A power supply for holding the light-emitting position after switching the position is not required in such a configuration, and the power consumed by the optical switch device is therefore reduced.

In the present invention, a plurality of concavities and convexities are preferably formed along the X-direction at a prescribed pitch in the corresponding areas facing each other in the Y-direction in the movable member and the fixed-side member, for mutually meshing and positioning the movable member in the X-direction when the movable member is pressed and fixed to the fixed-side member by the clamp mechanism. With such a configuration, the movable member is pressed and fixed by the clamp mechanism to the fixed-side member in the initial state, and the concavities and convexities on the movable member and the concavities and convexities on the fixed-side member mesh with each other in this state. From this state, the clamp mechanism first releases the clamp on the movable member when the light-emitting position is switched, and the magnetic drive circuit then drives the movable member in the Y-direction and lifts the movable member from the fixed-side member. The magnetic drive circuit subsequently drives the movable member to a prescribed position in the X-direction. When the movable member then arrives at the prescribed position in the X-direction and stops thereat, the movable member is thereafter pressed and fixed by the clamp mechanism to the fixed-side member. When this happens, the concavities and convexities formed in the movable member and fixed-side member intermesh with each other, and the movable member is positioned at a prescribed position in the X-direction. Therefore, the movable member is not offset in the X-direction and the stability of the light-emitting position is high with a relatively simple configuration, even if vibrations or other effects are transmitted from the outside.

In this case, the concavities and convexities formed in the movable member have at least one shape selected from a cross-sectional V-shaped concave portion and a cross-sectional V-shaped convex portion, and the concavities and convexities formed in the fixed-side member have at least the other one of the shapes selected from a cross-sectional V-shaped concave portion and a cross-sectional V-shaped convex portion. The position of the movable member in the X-direction is defined with high precision in such a configuration solely by the intermeshing of the concavities and convexities of the movable member and fixed-side member. More specifically, as long as the concavities and convexities have a cross-sectional V-shape, the positioning error of the movable member in the X-direction is corrected when the concavities and convexities intermesh with each other, even if the movable member stops in a position slightly offset from the desired position in the X-direction. Therefore, the precision of the light-emitting position can be increased.

The formation area of the concavities and convexities and the movement pathway of the movable member in the X-direction are preferably parallel on the movable member and the fixed-side member. With such a configuration, the movable member is driven with the same orientation as the clamp orientation, and the movable member is therefore smoothly clamped in an unchanged orientation after having been driven in the X-direction.

In the present invention, the fixed-side member preferably supports the movable member by using a plurality of suspension wires. With such a configuration, the orientation of the movable member is stable when the movable member is driven, and the light-reflecting member therefore does not tilt. Accordingly, the precision of the light-emitting position is high.

In this case, there is preferably a match between the position of the moveable member in the Y-direction when the moveable member is pressed and fixed by the clamp mechanism to the fixed-side member, and the position of the movable member in the Y-direction when thrust produced by the magnetic drive circuit in the Y-direction is applied. With such a configuration, since stress is not applied to the suspension wires in a state in which the movable member is pressed and fixed by the clamp mechanism to the fixed-side member, suspension wire fatigue can be reduced and the lifespan of the suspension wires can be extended.

There is preferably a match between the support center position of the movable member provided by the suspension wires and the center of gravity position of the entire moveable member. With such a configuration, the suspension wires can support the movable member in a stable orientation and the vibrations of the movable member can be inhibited when the movable member is moved or stopped.

There is preferably a match between the center position of the thrust applied to the movable member in the X-direction by the magnetic drive circuit and the center of gravity position of the entire moveable member. With such a configuration, the orientation of the movable member can be kept in an even more stabilized state when the movable member is driven, and vibrations can be inhibited when the movable member is driven or stopped.

The movement pathway of the movable member in the X-direction and the fixing area of the fixed-side member to which the movable member is pressed and fixed by the clamp mechanism are preferably parallel on the movable member and the fixed-side member.

The light-reflecting member is preferably a rectangular prism having an inclined surface for receiving and emitting light from the Z-direction, a first reflection surface for reflecting in the X-direction light that has entered from the inclined surface, and a second reflection surface which is perpendicular to the first inclined surface and with which light reflected from the first reflection surface is reflected toward the inclined surface. If such a rectangular prism mirror is adopted, the layout of the optical waveguide on the incident side and the optical waveguide on the emitting side is simple because the incoming optical axis and the outgoing optical axis are made to be parallel. The cost of the optical switch device can be reduced through the use of common optical members such as a rectangular prism mirror.

In the present invention, an orientation adjustment device prevents the movable member from tilting between the time that the movable member is driven by the magnetic drive circuit and the time that the movable member is clamped by the clamp mechanism. Such a configuration allows the movable member to be kept in a fixed orientation both when the movable member is clamped to the fixed-side member after being driven, and when the movable member is driven after being released from being clamped to the fixed-side member. Since the light-reflecting member does not tilt, the precision of the light-emitting position is high. In an optical VOA (Variable Optical Attenuator), the attenuation factor does not vary when the attenuator is being adjusted or fixed.

When the optical switch device of the present invention is used as a waveguide switching device or the like for a fiber-optic exchanger, a shared optical waveguide for input and a plurality of optical waveguides for output are arranged in the X-direction in positions that branch with respect to the light receiving/emitting surface of the light-reflecting member. In this case, the pitch between the concavities and the convexities may, for example, be 125 μm.

When the optical switch device of the present invention is used as an attenuator for suitably attenuating optical input, an optical waveguide for input, an optical waveguide for output, and an optical waveguide for monitoring are arranged in the X-direction in positions that branch with respect to the inclined surface. In this case, the pitch between the concavities and the convexities may, for example, be 1 μm. Provided that the position of the movable member is controlled, such a configuration allows a prescribed amount of output light to be directed to the waveguide for output while the output light is monitored via the waveguide for monitoring.

EFFECTS OF THE INVENTION

In the present invention, the movable member is driven by the magnetic drive circuit to a prescribed position in the X-direction and is thereafter pressed and fixed by the clamp mechanism to the fixed-side member. Therefore, the movable member is highly stable at the light-emitting position without being offset in the X-direction, even if vibrations and the like are transmitted from the outside.

BEST MODE FOR CARRYING OUT THE INVENTION

Embodiments of the present invention are described below with reference to the drawings.

Embodiment 1

Basic Principles of the Optical Waveguide Switching Device

FIG. 1 is a diagram schematically depicting the basic principles of an optical waveguide switching device according to Embodiment 1 of the present invention. In the following description, the mutually perpendicular directions will be described as the X-, Y-, and Z-directions.

In FIG. 1, an optical waveguide switching device 1 (optical switch device) of the present embodiment is an 8-channel optical waveguide switching device in which a single input-side optical fiber 20 extending in the Z-direction and eight output-side optical fibers 21 are disposed in parallel along the X-direction, and light output from the input-side optical fiber 20 can be directed to the any of the eight output-side optical fibers 21. The optical fiber array 3 composed of the input-side optical fiber 20 and output-side optical fibers 21 is configured so that the optical fibers are arranged in the X-direction at equal intervals at a pitch of 250 μm.

In the optical waveguide switching device 1 of the present embodiment, a prism mirror 10 driven in the X-direction is used as the light-reflecting member whereby light that has entered from the Z-direction is reflected and emitted in the Z-direction from a prescribed position offset in the X-direction. The prism mirror 10 is a rectangular prism that has an inclined surface 101 that receives and emits light along the Z-direction, a first reflection surface 102 whereby light that has entered from the inclined surface 101 is reflected in the X-direction, a second reflection surface 103 which is perpendicular to the first reflection surface 102 with which light reflected from the first reflection surface 102 is reflected toward the inclined surface 101. The inclined surface 101 (aperture side) directly faces the optical fiber array 3. In this case, the light emitted from the input-side optical fiber 20 is converted into collimated light by a collimating lens 22 prior to entering the prism mirror 10. Although not depicted in the diagrams, a collimating lens is also disposed between the eight output-side optical fibers 21 and the inclined surface 101 of the prism mirror 10.

In the optical waveguide switching device 1 configured in this manner, the prism mirror 10 is fixed in the position indicated by the solid line, for example. In this situation, the light emitted from the input-side optical fiber 20 enters the prism mirror 10, follows the route of optical path L1 wherein the first reflection surface 102 and second reflection surface 103 inside the prism mirror 10 each reflect the light at 90° angles, and moves to an output-side optical fiber 21a located on the rightmost end of the output-side optical fibers 21.

When the output-side waveguide is switched from the output-side optical fiber 21a to the output-side optical fiber 21f positioned sixth from the right, the prism mirror 10 is driven in the X-direction and moved to the position indicated by the dotted line. When the prism mirror 10 is moved in this manner, the light reflection position on the first reflection surface 102 and second reflection surface 103 inside the prism mirror 10 moves, and the light emitted from the input-side optical fiber 20 follows the optical path L2 and proceeds to the output-side optical fiber 21f.

In this case, since the input-side optical fiber 20 and the output-side optical fibers 21 are aligned at a pitch of 250 μm in the optical fiber array 3, the prism mirror 10 is moved in the X-direction in increments of 125 μm, which corresponds to ½ the pitch of the input-side optical fiber 20 and the output-side optical fibers 21.

Configuration of the Waveguide Switching Device

FIG. 2 is a perspective view seen from the diagonal rear of an optical waveguide switching device 1 according to Embodiment 1 of the present invention. FIG. 3 is a partial perspective view seen from the diagonal front of the optical waveguide switching device 1 shown in FIG. 2.

The optical waveguide switching device 1 of the present embodiment has a movable member 2 in which the inclined surface 101 faces in the Z-direction and which is mounted with a prism mirror 10, and a fixed-side member 13 for movably supporting the movable member 2 in the X- and Y-directions.

In addition to the prism mirror 10, mounted on the movable member 2 are a driving coil 5 for driving in one Y-direction, and a driving coil 6 for driving in the left and right X-directions. Mounted on the fixed-side member 13 are a supporting base 12, a driving magnet 7 for driving in one Y-direction, a driving magnet 8 for driving in the left and right X-directions, and a yoke 9. The driving magnet 7 is positioned inside the driving coil 5, and the driving magnet 8 faces the driving coil 6.

Two suspension wires 4 each on the left and right extend horizontally from the supporting base 12 in the Z-direction to sandwich the movable member 2 in a cantilever fashion and provide support from both sides in the X-direction. A control circuit (not shown) for controlling the driving coils 5 and 6 mounted on the movable member 2 is disposed on the side of the supporting base 12, and the suspension wires 4 serve as power lines that feed power to the driving coils 5 and 6 mounted on the movable member 2.

In this case, the center positions of the locations (distal portions of the suspension wires 4) in which the movable member 2 is supported by the four suspension wires 4, and the center of gravity position of the entire movable member 2 substantially match in the X-, Y-, and Z-directions. More specifically, the supporting positions of the movable member 2 of the four suspension wires 4 are set so that the center positions in the X-, Y-, and Z-directions thereof substantially match the positions in the X-, Y-, and Z-directions, respectively, of the center of gravity of the entire movable member 2.

The driving magnet 7 generates magnetic flux that interlinks with the driving coil 5 mounted on the movable member 2, forms a pair with the driving coil 5, and has a magnetic drive circuit that drives the movable member 2 in the Y-direction. Thrust is therefore applied to the movable member 2 in the Y-direction by feeding power to the driving coil 5. The driving magnet 8 generates magnetic flux that interlinks with the driving coil 6 mounted on the movable member 2, forms a pair with the driving coil 6, and has a magnetic drive circuit that drives the movable member 2 in the X-direction. Thrust is therefore applied to the movable member 2 in the X-direction by feeding power to the driving coil 6.

In this case, the driving coil 6 is fastened at a position symmetric to the movable member 2 in the X-direction in the center position in the Y-direction (thickness direction) of the movable member 2 and the center position in the Z-direction (lengthwise direction) of the movable member 2. For this reason, there is a substantial match between the center of thrust applied by the magnetic drive circuit to the movable member 2 in the X-direction and the center of gravity position of the entire movable member 2.

The driving coil 5 is fastened at the center position of the Y-direction (thickness direction) and X-direction (width direction) of the movable member 2, and is disposed slightly rearward in the Z-direction (lengthwise direction) of the movable member 2. Therefore, the center of thrust applied by the magnetic drive circuit to the movable member 2 in the Y-direction can also be made to substantially match the center of gravity position of the entire movable member 2 by offsetting the mounted position of the driving coil 5 on the movable member 2 in the Z-direction, or by mounting a weight or the like on the movable member 2 and offsetting the center of gravity in the Z-direction, or by another method.

The movable member 2 has in front thereof a prism mirror mounting portion 11 mounted with a prism mirror 10, and a frame portion 16 mounted with driving coils 5 and 6. The optical fiber array 3 described with reference to FIG. 1 is disposed further in front of the prism mirror mounting portion 11, and the optical axes Lin and Lout in FIGS. 2 and 3 show the optical axes of light emitted from the input-side optical fiber 20 of the optical fiber array 3, and light emitted to the output-side optical fiber 21 of the optical fiber array 3.

In an optical waveguide switching device 1 configured in such a manner, a clamp mechanism 40 is provided to the movable member 2 on the Z-direction side for pushing the movable member 2 down in the Y-direction and pressing and fixing the member 2 to the fixed-side member 13.

The clamp mechanism 40 has a metal clamp plate 41, pivoting support points 42 and 43 that pivotably support the clamp plate 41, a leaf spring 47 that exerts an urging force for pressing the distal portion of the clamp plate 41 to the upper surface 11b of the prism mirror mounting portion 11 of the movable member 2, and two solenoids 45 and 46 disposed on the opposite side of the movable member 2, with the pivoting support point 42 interposed therebetween. The pivoting support points 42 and 43 and the solenoids 45 and 46 stand erect from the fixed-side member 13. A hemispheric projection 44 (pushing portion) that makes contact with the upper surface 11b of the prism mirror mounting portion 11 is formed on the lower surface of the distal portion of the clamp plate 41.

In the movable member 2, a V-groove 30 is formed continuously at a fixed pitch across the entire range of the X-direction on the lower surface 11a facing the fixed-side member 13 of the prism mirror mounting portion 11. Therefore, a cross-sectional V-shaped concave portion and a cross-sectional V-groove convex portion are alternately formed on the lower surface of the movable member 2. In the present embodiment, since the pitch of the optical fiber array 3 is 250 μm, the pitch of the V-groove 30 is set to 125 μm in correspondence thereto.

In the fixed-side member 13, a fixing portion 15 having a longer dimension in the X-direction than the lower surface 11a is formed in a position facing the lower surface 11a of the prism mirror mounting portion 11 of the movable member 2, and a V-groove 31 (concavo-convex) that meshes with the V-groove 30 (concavo-convex) formed on the lower surface 11a of the movable member 2 is continuously formed on the upper surface 15a of the fixing portion 15. Therefore, the cross-sectional V-groove concave portion and cross-sectional V-groove convex portion are alternately formed on the fixed-side member 13. The pitch of the V-groove 31 is 125 μm.

In this case, the movement path of the movable member 2 in the X-direction, the lower surface 11a of the prism mirror mounting portion 11, and the upper surface 15a of the fixing portion 15 formed on the fixed-side member 13 are formed in a mutually parallel fashion.

In the optical waveguide switching device 1 configured in this manner, the power fed to the solenoids 45 and 46 is stopped in the clamp mechanism 40 in a state in which optical waveguide switching has been completed, and the movable member 2 is therefore pressed and fixed by the clamp plate 41 to the fixed-side member 13. In this state, the suspension wires 4 are not subjected to stress in the Y-direction, and the four suspension wires 4 all extend straight in parallel.

In the natural position in which the optical waveguide switching device 1 is not operating, the V-groove 31 and input-side optical fiber 20 are adjusted in advance so that the light emitted from the input-side optical fiber 20 is stopped at the reference position directed from the right side of the output-side optical fibers 21 to the third or fourth position. In this case, the suspension wires 4 are in a state in which stress in also not applied in the X-direction, and the four suspension wires 4 extend straight in parallel.

Description of Optical Waveguide Switching Operation

The operation of optical waveguide switching in the optical waveguide switching device 1 of the present embodiment is described below with reference to FIG. 4.

The diagrams in FIG. 4 are schematic diagrams depicting the positional relationship between the movable member 2 and the fixed-side member 13 when the optical waveguide is switched in the optical waveguide switching device 1.

The movable member 2 is pressed and fixed by the clamp plate 41 to the fixed-side member 13 in the initial fixed state, and the upper and lower V-grooves 30 and 31 are engaged, as shown in FIG. 4(a).

To switch the optical waveguide from this state, power is first fed to the solenoids 45 and 46 to provide resistance against the urging force of the leaf spring 47, the distal side of the clamp plate 41 is lifted, and the bound state of the movable member 2 is released, as shown in FIG. 4(b). Power is then fed to the driving coil 5 to move the movable member 2 in the upward Y-direction and lift the movable member 2 from the fixed-side member 13.

Power is subsequently fed to the driving coil 6, and the movable member 2 is moved in the X-direction, as shown in FIG. 4(c). When the movable member 2 has then moved to the desired position in the X-direction, the power fed to the driving coil 5 is stopped, and the movable member 2 is allowed to settle down in the Y-direction by the elastic return force of the suspension wires 4, as shown in FIG. 4(d).

Next, the power fed to the solenoids 45 and 46 is stopped. As a result, the clamp plate 41 pushes the movable member 2 down in the Y-direction and presses and fixes the movable member 2 to the fixed-side member 13, as shown in FIG. 4(e). The V-grooves 30 formed in the movable member 2 and the V-grooves 31 formed in the fixed-side member 13 mesh together, and the movable member 2 is positioned in the X-direction.

Power fed to the driving coil 6 is thereafter stopped, and optical waveguide switching is thereby completed. Therefore, the light that has entered the prism mirror 10 from the input-side optical fiber 20 is emitted to a prescribed output-side optical fiber 21 via the prism mirror 10.

Effects of the Present Embodiment

As described above, in the optical waveguide switching device 1, a magnetic drive actuator used in optical head drives or the like is used as an actuator for driving the prism mirror 10 in the X-direction, and the prism mirror 10 is moved by the actuator to a prescribed position in the X-direction. The movable member 2 is pressed and fixed by the clamp mechanism 40 to the fixed-side member 13 in a prescribed position in the X-direction. Therefore, since the movable member 2 is reliably positioned in a prescribed position in the X-direction, the movable member 2 is not offset in the X-direction and the stability of the light-emitting position is high, even if vibrations or other effects are transmitted thereto. With the movable member 2 pressed and fixed by the clamp mechanism 40 to the fixed-side member 13, meshing occurs between the V-grooves 30 and 31 formed at a prescribed pitch in the movable member 2 and fixed-side member 13. The movable member 2 is therefore reliably positioned in a prescribed position in the X-direction. Furthermore, the V-grooves 30 and 31 are used to position the movable member 2 in the X-direction. For this reason, if an error occurs in the stopping position of the movable member 2, this error is corrected when the movable member 2 is fixed to the fixed-side member 13, and the incident light can be reliably directed to the prescribed output-side optical fiber, as shown in FIGS. 4(d) and 4(e).

Since the prism mirror 10 consisting of a rectangular prism is used as the light-reflecting member for switching the optical path, the incoming and outgoing optical axes can be made parallel. The layout of the optical waveguide on the incoming side and the outgoing side is therefore simple. Since common optical members such as the prism mirror 10 are used, the cost of the optical waveguide switching device 1 can be reduced.

The suspension wires 4 are furthermore in a straight extended state in which stress is not applied in the Y-direction with the movable member 2 pressed and fixed by the clamp mechanism 40 to the fixed-side member 13. For this reason, since the fatigue of the suspension wires 4 is low, degradation of the suspension wires 4 can be prevented, and the reliability of the optical waveguide switching device 1 can be improved.

The movable member 2 is pressed and fixed to the fixed-side member 13 by the clamp plate 41 being acted on by the urging force of the leaf spring 47, and during that interval, power is fed to the driving coils 5 and 6, and power to the solenoids 45 and 46 is stopped. Accordingly, there is no need to constantly feed power to the driving coils 5 and 6 or the solenoids 45 and 46, and power consumption by the optical waveguide switching device 1 can therefore be reduced.

The movement path of the movable member 2 in the X-direction, the lower surface 11a of the prism mirror mounting portion 11, and the upper surface 15a of the fixing portion 15 formed on the fixed-side member 13 are formed in a mutually parallel fashion. Since the movable member 2 is therefore driven with the same orientation as the clamp orientation, the movable member is smoothly clamped in an unchanged orientation after having been driven in the X-direction. The waveguide switching operation of the optical waveguide switching device 1 is therefore made stable.

There is a substantial match between the center position of the location (distal portion of the suspension wires 4) in which the movable member 2 is supported by the four suspension wires 4 and the center of gravity position of the entire movable member 2. There is also a substantial match between the center of thrust applied by the magnetic drive circuit to the movable member 2 in the X-direction and the center of gravity position of the entire movable member 2. Therefore, when the movable member 2 is moved in the X-direction or stopped, the up and down, left and right vibrations of the movable member 2 can be reduced. The waveguide switching operation of the optical waveguide switching device 1 is therefore made stable.

Embodiment 2

Embodiment 1 is an example in which the present invention is applied to an optical waveguide switching device as one of a variety of optical switches. The present invention can also apply for a variable optical attenuator. In this embodiment where the present invention is applied to a variable optical attenuator, since the magnetic drive circuit for the prism mirror 10, the clamp mechanism, and other components are the same as embodiment 1, a detailed description of the shared portions will be omitted.

FIG. 5 is a perspective view schematically depicting the basic principles of a variable optical attenuator according to the present invention. In FIG. 5, a variable optical attenuator 100 suitably attenuates incident light from a single input-side optical fiber 200 to the variable optical attenuator 100, and outputs the light to an output-side optical fiber 210. In order to set the output of light to the output-side optical fiber 210 to the desired value, there is provided an optical waveguide 230 for monitoring that monitors a portion of the output light. There is also provided a control circuit (not shown) for the feedback control of the stop position of the prism mirror 10 on the basis of the value of the light incident on the optical waveguide 230 for monitoring.

The variable optical attenuator 100 is mounted with a rectangular prism mirror 10 that can be moved in the X-direction. The light emitted from the input-side optical fiber 200 is collimated by the collimating lens 22 prior to entering the prism mirror 10.

In the initial state, the prism mirror 10 is fixed in the position indicated by the solid line. In this situation, the light emitted from the input-side optical fiber 200 follows an optical path wherein the first reflection surface 102 and second reflection surface 103 inside the prism mirror 10 each reflect light at 90° angles with a certain width, and a luminous flux L10 is emitted from the inclined surface 101. In this case, the emitted light is input to both the output-side optical fiber 210 and the optical waveguide 230 for monitoring. Therefore, the light emitted from the prism mirror 10 via the optical waveguide 230 for monitoring is monitored, and if the prism mirror 10 is moved in the X-direction on the basis of the monitoring result, the light directed to the output-side optical fiber 210 can be brought to a prescribed attenuation factor.

When the prism mirror 10 is in the position indicated by the solid line, moving the prism mirror 10 to the position indicated by the dotted line in the X-direction on the basis of the monitoring result obtained via the optical waveguide 230 for monitoring causes a luminous flux L20 to be emitted from the inclined surface 101 because the optical axis position is offset in the prism mirror 10. The luminous energy incident on the output-side optical fiber 210 can therefore be reduced.

In this case, in order to suitably attenuate and output the input light in the variable optical attenuator 100, the movement pitch of the prism mirror 10 must be finely controlled. The pitch in the X-direction of the V-grooves 30 and 31 formed in the movable member 2 and fixed-side member 13 shown in FIGS. 2 and 3 is set at 1 µm for this reason.

Other Embodiments

In the above embodiments, continuous V-grooves 30 and 31 were formed in the movable member 2 and fixed-side member 13 as concavities and convexities for positioning the movable member 2 in the X-direction, and cross-sectional V-shaped concavities and cross-sectional V-shaped convexities were formed in both the movable member 2 and fixed-side member 13, but cross-sectional V-shaped convexities 30' may be formed at a prescribed pitch on the movable member 2, and cross-sectional V-shaped concavities 31' may be formed at a prescribed pitch on the fixed-side member 13, as shown in FIG. 6(a). Although not shown in the diagram, cross-sectional V-shaped concavities may be formed on the movable member 2 at a prescribed pitch, and cross-sectional V-shaped convexities may be formed on the fixed-side member 13, in a converse situation to that shown in FIG. 6(a).

Also, cross-sectional circular convexities 30" may be formed at a prescribed pitch on the movable member 2, and cross-sectional circular concavities 31" may be formed at a prescribed pitch on the fixed-side member 13, as shown in FIG. 6(b). Although not shown in the diagram, cross-sectional circular concavities may be formed on the movable member 2 at a prescribed pitch, and cross-sectional circular convexities may be formed on the fixed-side member 13, in a converse situation to that shown in FIG. 6(*b*).

In the above embodiments, the clamp mechanism 40 was situated on the light receiving/emitting side of the movable member 2, but if the clamp mechanism 40 is disposed on the side opposite that of the light receiving/emitting side of the movable member 2, as shown in FIG. 7, there is an advantage in that the layout of the optical fiber array 3 is simplified.

Also in the above embodiments, a leaf spring 47 was disposed in the distal portion of the clamp plate 41 as a spring member for pressing and fixing the movable member 2 to the fixed-side member 13, but the present invention is not limited to a leaf spring 47, and a coil spring may be used as such as spring member. The clamp plate 41 itself may be configured as a leaf spring.

In the above-described embodiments, a coil spring or other spring that receives the lower surface of the movable member 2 may be disposed as an orientation adjustment device in the area on the upper surface of the fixed-side member 13 in which the movable member 2 settles. When the movable member 2 is driven by the magnetic drive circuit in such a configuration, the movable member 2 is prevented from tilting while clamped by the clamp mechanism 40.

INDUSTRIAL APPLICABILITY

In the present invention, the movable member is driven by the magnetic drive circuit to a prescribed position in the X-direction and is thereafter pressed and fixed by the clamp mechanism to the fixed-side member. Therefore, the movable member is not offset in the X-direction and the stability of the light-emitting position is high, even if vibrations or other effects are transmitted from the outside. A highly reliable optical switch can therefore be provided.

BRIEF DESCRIPTION OF THE DRAWINGS

FIG. 1 is a diagram schematically depicting the basic principles of an optical waveguide switching device obtained by applying the present invention;

FIG. 2 is a perspective view seen from the diagonal rear of an optical waveguide switching device according to Embodiment 1 of the present invention;

FIG. 3 is a partial perspective view seen from the diagonal front of the optical waveguide switching device shown in FIG. 2;

FIGS. 4(*a*), 4(*b*), 4(*c*), 4(*d*), and 4(*e*) are schematic diagrams depicting the positional relationship and other relationships between the movable member and the fixed-side member when the optical waveguide is switched in an optical waveguide switching device according to Embodiment 1 of the present invention;

FIG. 5 is a perspective view schematically depicting the basic principles of a variable optical attenuator according to the present invention;

FIGS. 6(*a*) and 6(*b*) are schematic diagrams of the concavo-convex structure that can be used for positioning in the X-direction of the movable object in an optical switching device according to the present invention; and FIG. 7 is a perspective view seen from the diagonal rear of another optical waveguide switching device according to the present invention.

SYMBOLES

1 Optical waveguide switching device (optical switch device)
2 Movable member
3 Optical fiber array
4 Wire
5,6 Driving coils
7,8 Driving magnets
10 Prism mirror
13 Fixed-side member
20 Input-side optical fiber
21 Output-side optical fiber
30,31 V-grooves (concaves and convexes)
40 Clamp mechanism
41 Clamp plate
45,46 Solenoids
44 Projection (pushing portion)
100 Variable optical attenuator
200 Input-side optical fiber
210 Output-side optical fiber
230 Optical waveguide for monitoring

The invention claimed is:

1. An optical switch device which has a movable member mounted with a light-reflecting member for reflecting light that is incident from a Z-direction and emitting a light from a prescribed position offset in an X-direction;
a fixed-side member for movably supporting the movable member in the X- and a Y-directions; and
a magnetic drive circuit for driving the movable member in the X- and Y-directions, the X-, Y-, and Z-directions being perpendicular to each other, comprising:
a clamp mechanism for releasing the movable member when the movable member is to be driven, and pushing the movable member in the Y-direction when the movable member has been driven to a prescribed position in the X-direction so as to press and fix the movable member to the fixed-side member.

2. The optical switch device according to claim 1, wherein the clamp mechanism comprises a pushing portion for pushing the movable member toward the fixed-side member; a spring member for generating urging force whereby the pushing portion presses and fixes the movable member to the fixed-side member; and a solenoid for resisting the urging force of the spring member and separating the pushing portion from the movable member.

3. The optical switch device according to claim 1, wherein a plurality of concavities and convexities are formed along the X-direction at a prescribed pitch in corresponding areas facing each other in the Y-direction in the movable member and the fixed-side member, for mutually meshing and positioning the movable member in the X-direction when the movable member is pressed and fixed to the fixed-side member by the clamp mechanism.

4. The optical switch device according to claim 3, wherein the concavities and convexities formed in the movable member comprise at least one shape selected from a cross-sectional V-shaped concave portion and a cross-sectional V-shaped convex portion, and the concavities and convexities formed in the fixed-side member comprise at least the other one of the shapes selected from a cross-sectional V-shaped concave portion and a cross-sectional V-shaped convex portion.

5. The optical switch device according to claim 3, wherein formation area of the concavities and convexities and a movement pathway of the movable member in the X-direction are parallel on the movable member and the fixed-side member.

6. The optical switch device according to claim 1, wherein the fixed-side member supports the movable member by using a plurality of suspension wires.

7. The optical switch device according to claim 6, wherein there is a match between a position of the moveable member in the Y-direction when the moveable member is pressed and fixed by the clamp mechanism to the fixed-side member, and a position of the movable member in the Y-direction when thrust produced by the magnetic drive circuit in the Y-direction.

8. The optical switch device according to claim 6, wherein there is a match between a support center position of the movable member provided by the suspension wires, and a center of gravity position of the entire moveable member.

9. The optical switch device according to claim 6, wherein there is a match between a center position of the thrust applied to the movable member in the X-direction by the magnetic drive circuit, and a center of gravity position of the entire moveable member.

10. The optical switch device according to claim 6, wherein a movement pathway of the movable member in the X-direction, and a fixing area of the fixed-side member to which the movable member is pressed and fixed by the clamp mechanism are parallel on the movable member and the fixed-side member.

11. The optical switch device according to claim 1, wherein the light-reflecting member is a rectangular prism comprising an inclined surface for receiving and emitting light along the Z-direction, a first reflection surface for reflecting in the X-direction light that has entered from the inclined surface, and a second reflection surface which is perpendicular to the first inclined surface and with which light reflected from the first reflection surface is reflected toward the inclined surface.

12. The optical switch device according to claim 1, comprising orientation adjustment means for preventing the movable member from tilting between a time that the movable member is driven by the magnetic drive circuit and a time that the movable member is clamped by the clamp mechanism.

13. The optical switch device according to claim 1, wherein a shared optical waveguide for input and a plurality of optical waveguides for output are arranged in positions that face a light receiving/emitting surface of the light-reflecting member.

14. The optical switch device according to claim 3, wherein a shared optical waveguide for input and a plurality of optical waveguides for output are arranged in the X-direction in positions that face the light receiving/emitting surface of the light-reflecting member, and a pitch between the concavities and the convexities is 125 µm.

15. The optical switch device according to claim 1, wherein an optical waveguide for input, an optical waveguide for output, and an optical waveguide for monitoring are arranged in the X-direction in positions that face the light receiving/emitting surface of the light-reflecting member.

16. The optical switch device according to claim 3, wherein an optical waveguide for input, an optical waveguide for output, and an optical waveguide for monitoring are arranged in the X-direction in positions that face the light receiving/emitting surface of the light-reflecting member, and a pitch between the concavities and the convexities is 1 µm.

* * * * *